May 14, 1968  R. N. LAAKANIEMI ET AL  3,382,883
DIFFERENTIAL PURE FLUID PRESSURE SENSOR
Filed Jan. 25, 1965
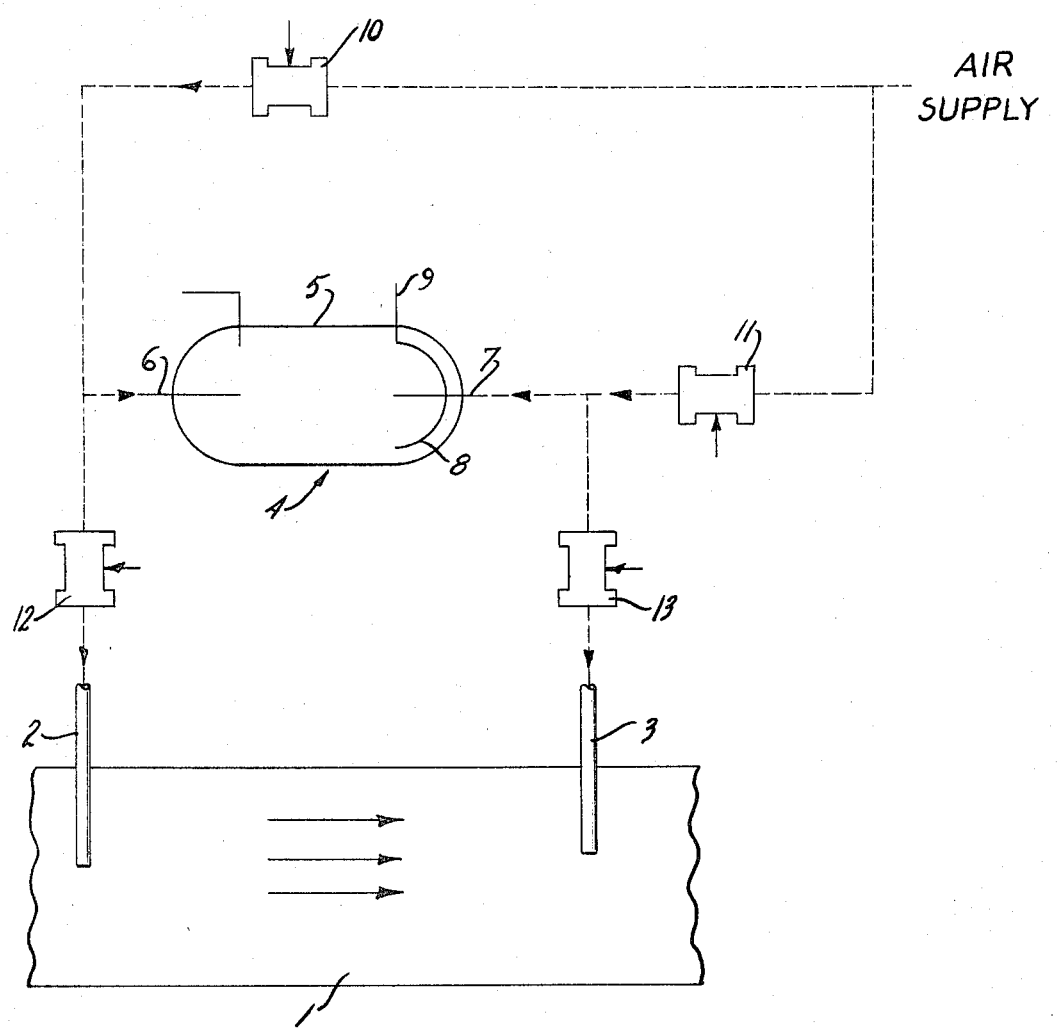
INVENTORS
RICHARD N. LAAKANIEMI
THOMAS J. LECHNER, JR.
FRANK A. KUCZKOWSKI
BY
*Andrus & Starke*
Attorneys

United States Patent Office 3,382,883
Patented May 14, 1968

3,382,883
DIFFERENTIAL PURE FLUID PRESSURE SENSOR
Richard N. Laakaniemi, South Milwaukee, Thomas J. Lechner, Jr., Menomonee Falls, and Frank A. Kuczkowski, Glendale, Wis., assignors to Johnson Service Company, Milwaukee, Wis., a corporation of Wisconsin
Filed Jan. 25, 1965, Ser. No. 427,678
5 Claims. (Cl. 137—81.5)

ABSTRACT OF THE DISCLOSURE

A pure fluid impact modulator is provided having a pair of opposed orifices establishing directly engaging and impacting streams. The orifices are connected to an air supply to establish opposing streams. Additionally, the orifices are each connected to a static pressure probe through an adjustable restrictor. The probes are connected in a fluid flow line to sense the static pressure and modulate the relative strengths of the streams from the orifices. The supply pressure is selected to be above the maximum sensed pressure such that the fluid flow through the sensing probes is always outwardly with respect to the impact modulator.

---

This invention relates to a pure fluid sensor and particularly to a senor which can sense the difference between positive and/or negative pressures with respect to ambient.

Pure fluid control devices have recently been developed generally for purposes of providing fluid controls similar to present electrical or electronic controls. A highly satisfactory form of a pure fluid modulator or amplifying means is disclosed in the copending application of Bjorn G. Bjornsen et al. entitled, Fluid Control Apparatus which was filed on Sept. 30, 1963 with Ser. No. 320,680, now Patent No. 3,272,215, and which is assigned to the same assignee as the present application. Generally, as disclosed therein, the modulator employs a pair of opposed streams defining an output radial jet at an impacting balancing position with respect to an output chamber and particularly a control orifice. By varying the relative strengths of the two streams, the position of the radial jet can be moved with respect to the orifice to the output chamber and thereby vary the output pressure signal. The present invention is particularly directed to the use of such an impact modulator constructed and biased in a manner to permit sensing of varying low pressures and differences of such pressures whether negative or positive.

Generally, the present invention includes a set point impact modulator such as disclosed in the copending application of Bjorn G. Bjornsen et al. entitled Pure Fluid Operational Amplifier which was filed on Nov. 30, 1964 with Ser. No. 414,808 and assigned to the same assignee as this application. The set point impact modulator is interconnected to a pair of biasing signal supplies for establishing the two main opposing streams. Additionally, sensing means are connected to the nozzles through suitable restrictors. The relative strength of the two impacting streams determines the output of the device and their strength, determined by the main input biasing supplies, are arranged in relation to the signal pressures such that the signal pressures never establish or cause flow into the modulator. Thus, the restricted supplies deliver flow to the summing impact modulator and also transmit flow to the signal sources. The signal pressures act as retarding potentials to modulate the flow to the signal source and thereby modulate the nozzle potential and flow.

Fixed restrictors are interconnected in the several supply and signal lines to provide predetermined fluid signal resistances. The restrictors are chosen such that the summing impact modulator delivers a predetermined output for given signal pressures. Most important, the restrictors are chosen in a special relationship to each other to minimize the effect of the signal pressure on the indicated output pressure when a difference is being measured. This special relationship states that the ratio of the independent side to dependent side supply resistors and independent side to dependent side signal resistors must be the inverse of the independent to dependent supply orifice areas. By employing one or more variable restrictors with limited adjustment different signal pressures can be sensed without upsetting the independence of output pressures of signal levels.

The pressure difference sensor is made direct acting or reverse acting by proper connection of the higher of the compared pressure signals to the proper biased input of the summing modulator.

The continuous outward flow from the modulator to the signal source is also of significance in installations where the sensed fluid may contain undesirable contaminates such as dirt, dangerous elements and the like because the sensed fluid is prevented from entering into the pure fluid system via the sensing line.

The present invention thus provides an improved fluid sensor for establishing an output proportional to relatively low level pressure signals.

The drawing furnished herewith illustrates an embodiment of the present invention clearly disclosing the above advantages and features as well as others which will be clear to those skilled in the art.

The drawing is a diagrammatic view of a static pressure sensing system employing an impact modulator connected to biasing and signal supplies in accordance with the present invention.

In the drawing, the present invention is shown applied to measure the flow of fluid through a duct 1, which may be carrying fluid. A pair of sensing probes 2 and 3 is mounted in the duct 1 in suitably spaced longitudinal relation to provide static pressure signals generally in accordance with the fluid pressure loss or the like in the duct 1. The probes 2 and 3 form the inputs to a set point impact modulator 4 which is adapted to compare the static pressure signals and produce an output signal proportional thereto.

More particularly, the impact modulator 4 which is schematically shown may be constructed in accordance with the teaching of the previously referred to first named copending application of Bjorn G. Bjornsen et al. A thorough discussion of the theory of the impact modulator is set forth therein and the illustrated modulator 4 is only briefly described to the extent necessary to clearly understand the present invention.

The illustrated impact modulator 4 includes a body or enclosure 5 having a pair of opposed and spaced nozzles 6 and 7 with selected orifices to define a pair of similar oppositely flowing streams, not shown. Output chamber or collector 8 includes a control orifice, not shown, aligned with the stream and an output signal line 9. As more fully developed in the above noted application, the opposing streams established by the nozzles 6 and 7 create an impacting balance position dependent on the relative strength of the two streams. Generally, the balance occurs within or at the orifice to collector 8 and creates an output signal which is proportional to the differential input stream pressures. In the drawing, the housing 5 is schematically shown to form a closed reference chamber connected by a suitable tap to atmospheric or other suitable reference.

In accordance with the present invention, each of the nozzles 6 and 7 is connected to a main air or other fluid supply, not shown, through a corresponding variable or fixed restrictor 10 and 11. Probes 2 and 3 are also connected to the lines 6 and 7 through their own variable or fixed restrictors 12 and 13. The pressure and streams supplied through restrictors 10 and 11 to the nozzles 6 and 7 are greater than any possible pressure established by the probes 2 and 3. Consequently, the actual flow, if any, through the signal lines is toward probes 2 and 3.

The several restrictors 10–13, inclusive, are chosen or adjusted to provide a suitable output with preselected signal pressures and provide maximum gain compatible with a minimum supply air consumption. Further, by proper selection of the resistors, the dependence of the output pressure on the level of the two signals at a given difference can be minimized. The variable restrictors also allow limited adjustment for different pressure ranges within any given design.

In operation, the main supply to nozzles 6 and 7 provides a pair of opposing impacting streams establishing a selected balance position with respect to the orifice to collector 9. It also provides a positive flow through the restrictors 12 and 13 to probes 2 and 3. Each flow is opposed by the sensed pressure of probes 2 and 3 and the sensed signal pressures thus act as retarding forces and potentials which modulate the main flow to produce an output which is proportional to the sensed signal or signals.

To provide direct action, the higher output pressure signal is applied to the probe 2 such that the higher sensed signal modulates the main stream applied to nozzle 6 and the lower sensed pressure sensed by probe 3 is applied through the restrictor 13 to modulate the flow with respect to the nozzle 7. If the pressure at probe 2 increases, the opposition to flow of the main supply toward the probe is increased and the input pressure signal to the nozzle 6 will be correspondingly increased. This will tend to move the impact position toward the collector 8 and increase the output pressure at tap 9 in proportion to the sensed signal. If the signal of probe 3 increases, it will result in an increased signal at nozzle 7 which will tend to move the impact position outwardly of the collector 8 and thereby reduce the output pressure. Reduced sensed signals at probes 2 and 3 result in a corresponding reduction and increase in the output pressure.

For reverse action; that is, with the output varying in an opposite direction with respect to changes in the higher pressure, the connection of the probes 2 and 3 with respect to restrictors 12 and 13, and therefore the nozzles 6 and 7, is reversed.

If necessary to sense a single signal, an appropriate fixed reference signal is supplied to the one nozzle through the corresponding restrictor.

As previously noted, the restrictors are particularly selected such that the resistance ratio of the supply restrictors 10 and 11 and of the signal restrictors 12 and 13 are the inverse of the ratio of the orifice areas of the nozzles 7 and 6, or in equation form:

$$\frac{R_{10}}{R_{11}} = \frac{R_{12}}{R_{13}} = \frac{A_7}{A_6}$$

The present invention thus can sense the difference between positive and/or negative pressures with respect to ambient and provides a direct or reverse output depending only upon the input connection as long as the sensed signal pressures are less than the main stream pressures. Thus, the device acts as a potential control rather than a flow or current device. The effect of the sensed signals may be transmitted over a considerable distance because the line pressure losses are supplied by the supply air and not the signal air. By proper adjustment or alteration of the several restrictors, the output pressure can be made substantially the same for any given signal pressure difference regardless of the total pressure level of the sensed signal. The outward flow also prevents any danger of loss of the sensed fluid or transmission of the sensed fluid into the pure fluid amplifier, which can be of significance if the sensed fluid contains dangerous and/or undesirable contaminants.

The present invention thus provides a reliable and rugged pure fluid sensor for detecting small pressure signals.

Various modes of carrying out the invention are contemplated as being within the scope of the following claims particularly pointing out and distinctly claiming the subject matter which is regarded as the invention.

We claim:

1. A pure fluid differential pressure sensor system for detecting low level pressure signals comprising;
    an impact modulator having a pair of opposed stream forming orifice means for forming direct impacting fluid streams and means for sensing the impact position of the streams emitted from the orifice means, said orifice means being the only means for directing fluid into the modulator,
    pressurized fluid supply means connected through first and second passage means to said pair of orifice means for establishing pressures therein greater than the pressure signals,
    and a pair of sensing means for sensing said low pressure signals each connected to one of said passage means thereby modulating the flow through the corresponding orifices in accordance with the fluid signals and providing a continuous outward flow from the modulator to the signal source.

2. The sensor of claim 1 wherein said sensing means constitutes fluid sensing probe means connected to the passage means through fluid restrictors.

3. The sensor of claim 2 wherein said fluid supply means is connected to said passage means through fluid restrictors.

4. The sensor of claim 3 wherein said restrictors are variable.

5. The sensor of claim 4 wherein said restrictors and orifice means are generally selected such that the resistance ratio of the supply restrictors and the signal restrictors are the inverse of the corresponding orifice areas.

References Cited

UNITED STATES PATENTS

| | | | |
|---|---|---|---|
| 3,016,063 | 1/1962 | Hausmann | 137—81.5 |
| 3,191,858 | 6/1965 | Sowels | 137—81.5 |
| 3,209,774 | 10/1965 | Manion | 137—81.5 |
| 3,220,428 | 11/1965 | Wilkerson | 137—81.5 |
| 3,238,959 | 3/1966 | Bowles | 137—81.5 |
| 3,272,212 | 9/1966 | Bowles | 137—81.5 |
| 3,272,215 | 9/1966 | Bjornsen | 137—81.5 |
| 3,279,489 | 10/1966 | Bjornsen | 137—81.5 |

M. CARY NELSON, *Primary Examiner.*

W. R. CLINE, *Assistant Examiner.*